United States Patent

Hoch

[11] 4,224,785
[45] Sep. 30, 1980

[54] COMBINED AXLE, BUMPER AND SAFETY GUARD FOR WALK-BEHIND MOWER

[75] Inventor: John J. Hoch, Beaver Dam, Wis.

[73] Assignee: Deere & Company, Moline, Ill.

[21] Appl. No.: 5,134

[22] Filed: Jan. 22, 1979

[51] Int. Cl.³ .................... A01D 53/00; A01D 75/18; A01D 75/20

[52] U.S. Cl. .................... 56/17.4; 56/320.1; 280/43.13

[58] Field of Search .................. 56/17.2, 17.4, 320.1, 56/320.2; 280/43.13, 43.17

[56] References Cited

U.S. PATENT DOCUMENTS

| | | | |
|---|---|---|---|
| 2,848,859 | 8/1958 | Abel | 56/17.2 |
| 2,929,186 | 3/1960 | Bundy | 56/320.2 |
| 2,963,842 | 12/1960 | Estes | 56/320.1 |
| 3,038,736 | 6/1962 | Root | 280/43.17 |
| 3,292,351 | 12/1966 | Larson et al. | 56/17.2 |
| 3,568,421 | 3/1971 | Smith et al. | 56/320.2 |
| 3,677,574 | 7/1972 | Cyr | 280/43.13 |
| 3,872,654 | 3/1975 | Brundage et al. | 56/17.2 |
| 3,927,513 | 12/1975 | Ramaker et al. | 56/17.4 |

Primary Examiner—Paul J. Hirsch

[57] ABSTRACT

A walk-behind mower includes a pair of vertically adjustable front wheels supported on a unitary axle having an offset central portion, which serves as a bumper to protect the mower deck from striking foreign objects when the wheels are set for lower cutting heights and which serves as a safety guard to prevent anyone's feet or other objects from engaging the cutting blade when the wheels are set for higher cutting heights.

2 Claims, 3 Drawing Figures

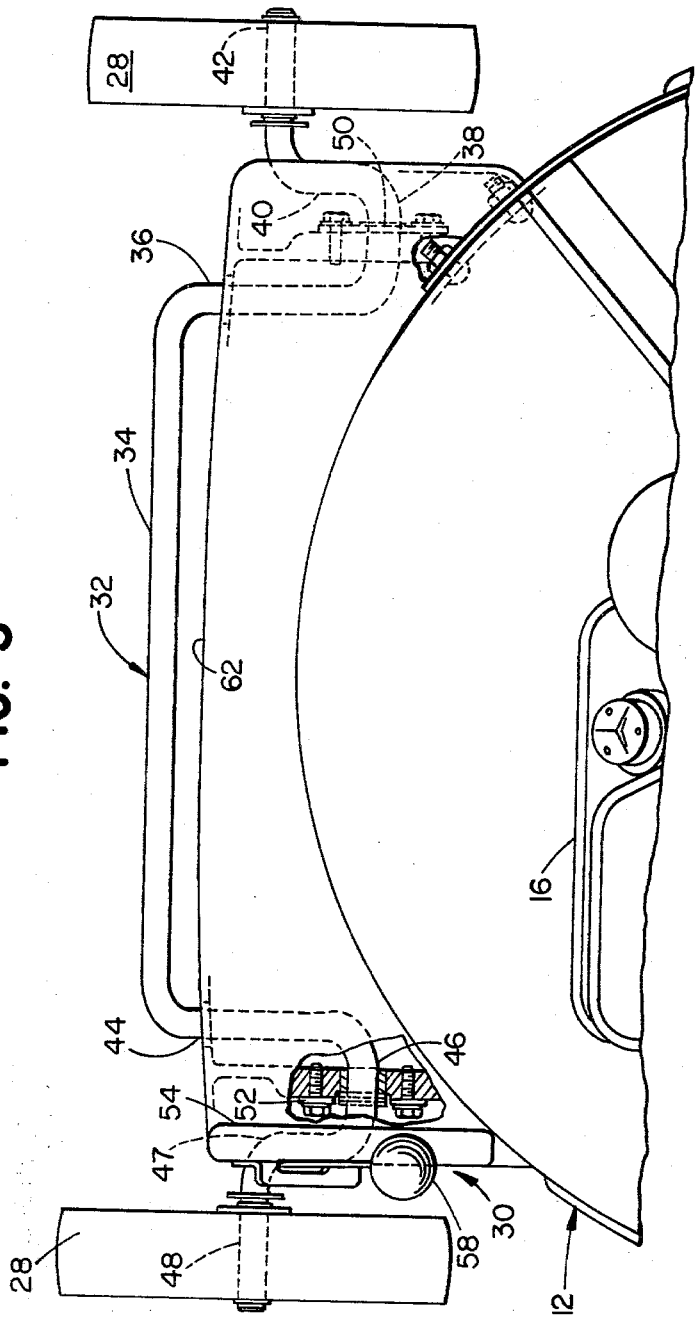

COMBINED AXLE, BUMPER AND SAFETY GUARD FOR WALK-BEHIND MOWER

BACKGROUND OF THE INVENTION

The present invention relates to walk-behind mowers and more particularly relates to a multi-purpose structure for vertically adjustably mounting the front wheels to the frames of such mowers.

It is a common practice to mount the front and rear sets of wheels of walk-behind lawn mowers for vertical adjustment relative to the mower frames for the purpose of adjusting the cutting height. While these mowers are usually provided with rear safety shields which contact the ground throughout the vertical range of movement of the wheels, no similar shield is provided at the forward end of the mowers. Thus, the problem arises that at least when the wheels are adjusted for the mower to operate at its higher cutting heights, the clearance between the ground and the bottom of the mower frame is sufficient to allow a person's foot to be inserted beneath the mower frame and tipped into engagement with the cutting blade.

SUMMARY OF THE INVENTION

According to the present invention there is provided a novel mounting means for the front wheels of a walk-behind lawn mower.

A broad object of the invention is to provide a walk-behind mower with a simple, inexpensive guard for preventing a person's foot or other objects from coming into contact with the mower blade when the latter is operating at the higher cutting heights of the mower.

A more specific object is to provide a guard, as set forth in the previous object, wherein the guard is formed as a part of a unitary axle rod on which the front wheels are journalled.

Yet another object is to provide a guard, as set forth in the immediately preceding object, wherein the axle rod also serves as a bumper when the mower is operating at its lower cutting heights.

These and other objects will become apparent from a reading of the following description together with the appended drawings.

DESCRIPTION OF THE DRAWINGS

FIG. 3 is a top plan view of the front wheel mounting.

DESCRIPTION OF THE PREFERRED EMBODIMENT

Figure 1:
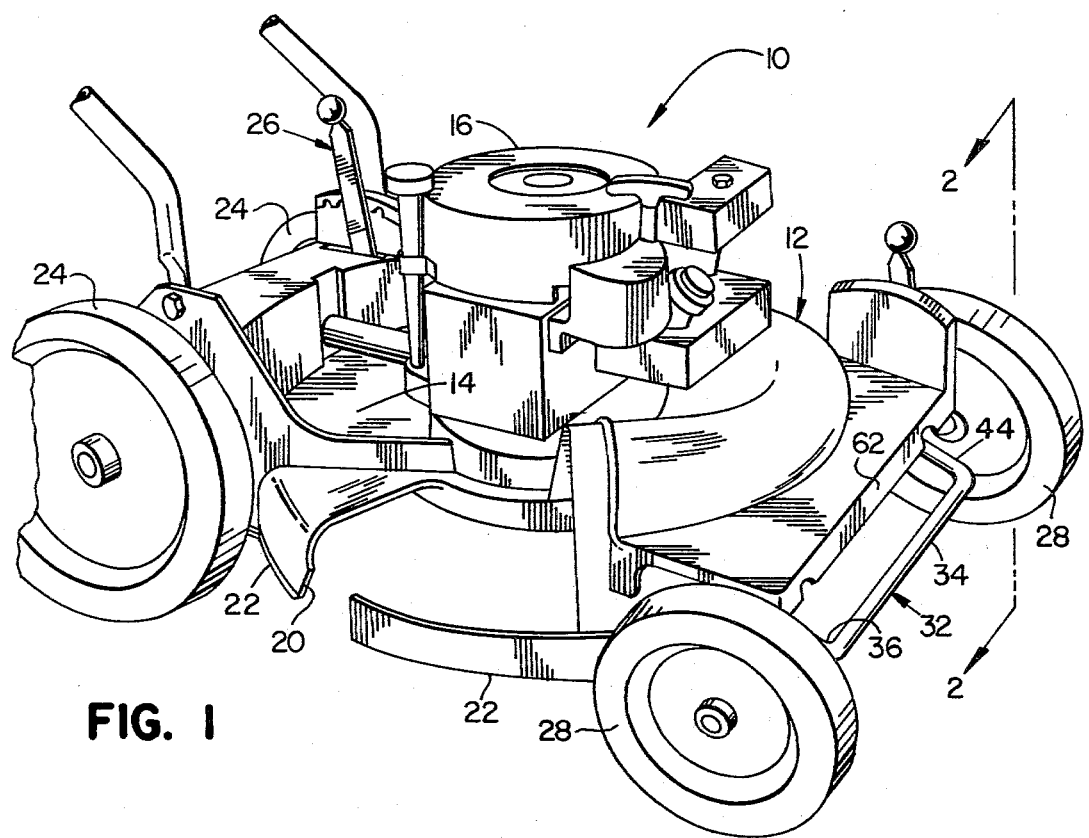
FIG. 1 is a perspective view of a walk-behind lawn mower provided with an improved front wheel mounting means constructed in accordance with the present invention.
Figure 2:
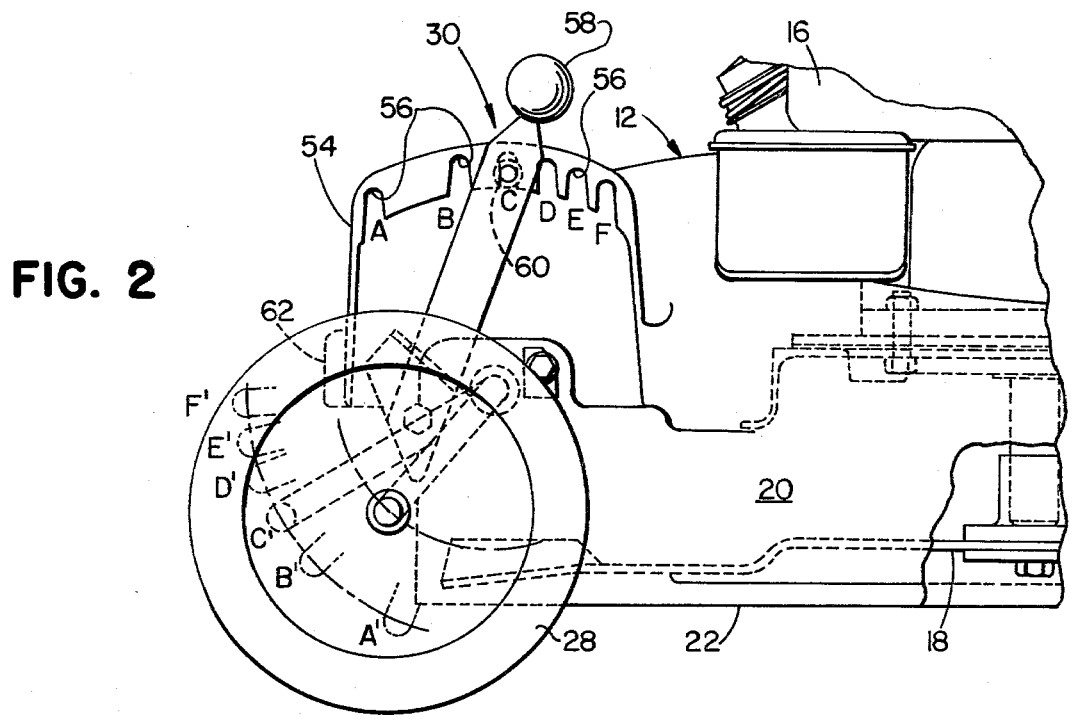
FIG. 2 is a left side view of the wheel mounting.

Referring now to the drawings, therein is shown a walk-behind lawn mower 10 including a blade housing 12 having a top wall 14 on which is mounted an engine 16 having a vertical drive shaft on which is mounted a mower blade 18. As is conventional, the housing 12 includes a skirt 20 surrounding the path swept by the blade 18 and having a lower edge 22 located below the path. Supporting the housing 12 above the ground are a rear pair of ground wheels 24 mounted for vertical adjustment through means of an adjustment mechanism 26 and a front pair of ground wheels 28 mounted for vertical adjustment through means of an adjustment mechanism 30. As the mounting for the rear wheels forms no part of the present invention, the specifics of the mounting therefor is not disclosed or described.

The means for mounting the front wheels 28 for vertical adjustment comprises an axle rod 32 having a central U-shaped portion 34 including a right leg 36 joined to the inner end of a transverse mounting portion 38, which in turn has its outer end joined to a crank portion 40. The crank portion 40 has an out-turned end portion 42 on which the right front wheel 28 is journalled for rotation. Similarly, the U-shaped portion 34 includes a left leg 44 joined to the inner end of a transverse mounting portion 46, which in turn has its outer end joined to a crank portion 47. The crank portion 47 has an out-turned end portion 48 on which the left front wheel 28 is journalled for rotation. The mounting portions 38 and 46 of the rod 32 are axially aligned with each other and are respectively pivotally secured to the housing by means of transversely spaced right and left brackets 50 and 52. The adjustment mechanism 30 includes a vertical sector-shaped projection 54 forming part of the left front of the housing 12 and including a series of angularly spaced detent notches 56 in an outer surface thereof. Fixed to the axle rod 32 adjacent the location where the mounting and crank portions 46 and 47 are joined to each other is a lever 58 constructed of spring metal and carrying a pin 60 located for reception in selected ones of the detent notches 56 so as to selectively releasably hold the axle rod in various annular positions and to thus fix the ground wheels 28 at various vertical positions relative to the housing 12. Such adjustment of the front wheels 28 is, of course, made together with corresponding rear wheel adjustment in order to adjust the cutting height of the mower blade 18. Thus, the mower blade 18 will be at its highest cutting height when the lever 58 is in a first extreme position A (FIG. 3), the cutting height of the blade decreasing as the blade is moved clockwise to a second extreme position F.

It is significant to note that as the lever 58 is moved between its extreme positions A and F, the U-shaped central portion 34 of the axle rod 32 will likewise be swung between corresponding extreme positions A' and F'. When the central axle rod portion 34 occupies the position A', it is located entirely rearwardly of a forward end 62 of the housing 12 and projects to a level below the lower edge 22 of the skirt 20. In this position, the rod portion 34 serves as a safety guard which is effective to prevent a person's foot inserted beneath the forward end of the housing 12, from coming into contact with the blade. Of course, the rod portion 34 also prevents other objects from coming into contact with the blade 18.

When the rod portion 34 is in its position B', it no longer is located entirely behind the forward end 62 of the housing 12 and is no longer located below the level of the skirt edge 22. In this position, the rod portion 34 still serves as a safety guard and additionally serves as a bumper for preventing the housing 12 from striking objects such as posts or boulders or the like.

When the rod portion 34 occupies any one of its positions C', D', E' or F', it serves primarily as a bumper, it being noted that the housing 12 itself acts somewhat as a safety guard when the blade is operating at these lower cutting heights.

Although the U-shaped rod portion 34 could be shaped differently so as to serve as a bumper throughout its range of adjustment, mowers of this type normally are not operated at the higher cutting heights and therefore the operation of the rod portion 34 as a bumper at these higher cutting heights was sacrificed in order that the size of the rod portion could be minimized.

I claim:

1. In a walk-behind lawn mower including a mower blade housing supported on front and rear sets of vertically adjustable wheels an improved front wheel support, comprising: a unitary rod having right and left transversely spaced mounting portions pivotally mounted in transversely spaced forward end portions of the blade housing such as to define a transverse axis about which the front set of wheels are vertically pivotally swingable to effect their vertical adjustment relative to the housing; said unitary rod including a central U-shaped portion having opposite ends extending orthogonal to and respectively joined to inner ends of the right and left mounting portions; said mounting rod further including right and left crank portions extending orthogonally to and respectively being joined to outer ends of the right and left mounting portions, the right and left crank portions respectively terminating in outturned right and left ends; said front set of wheels consisting of right and left wheels journalled for rotation on the right and left ends; adjustment-effecting means coupled between the housing and the rod for rotating and releasably holding the rod in various positions to thereby effect vertical adjustment of the right and left wheels relative to the housing to vary the cutting height of the mower; and said U-shaped portion of the rod being dimensioned such that it extends forwardly beyond the front of the housing in at least those positions of the rod for effecting low cutting heights whereby the U-shaped portion of the rod serves as a bumper to protect the housing from striking foreign objects.

2. The walk-behind mower defined in claim 1 wherein the U-shaped portion of the rod is dimensioned to extend below the level of the forward end of the housing at least when the rod is in those positions for effecting high cutting heights whereby the U-shaped portion of the rod serves as a guard.

* * * * *